United States Patent [19]

Lundberg et al.

[11] Patent Number: 4,647,603

[45] Date of Patent: Mar. 3, 1987

[54] CONTROLLED GELATION OF HYDROCARBON SOLUTIONS CONTAINING INTERPOLYMER COMPLEXES

[75] Inventors: Robert D. Lundberg, Bridgewater; Ilan Duvdevani, Leonia; Dennis G. Peiffer, East Brunswick, all of N.J.

[73] Assignee: Exxon Research and Engineering Company, Florham Park, N.J.

[21] Appl. No.: 749,020

[22] Filed: Jun. 26, 1985

Related U.S. Application Data

[63] Continuation of Ser. No. 547,955, Nov. 2, 1983, abandoned.

[51] Int. Cl.$^4$ .......................... C08J 3/08; C08L 39/08; C08L 15/00; C08L 23/34
[52] U.S. Cl. ..................... 523/339; 523/337; 524/108; 524/113; 524/318; 524/376; 524/378; 524/390; 524/516; 524/505; 524/140; 524/210
[58] Field of Search ............... 524/516, 484, 481, 390, 524/376, 378, 318, 108, 113, 140, 210; 523/336, 339

[56] References Cited

U.S. PATENT DOCUMENTS

| | | | |
|---|---|---|---|
| 3,467,604 | 9/1969 | Michaels | 521/62 |
| 3,642,728 | 2/1972 | Canter | 525/353 |
| 3,925,280 | 12/1975 | Lundberg | 521/504 |
| 4,089,834 | 5/1978 | Powell | 521/62 |
| 4,100,128 | 7/1978 | Sartori | 524/484 |
| 4,282,130 | 8/1981 | Lundberg | 524/916 |
| 4,322,329 | 3/1982 | Lundberg | 524/389 |
| 4,361,658 | 11/1982 | Lundberg | 524/916 |
| 4,371,652 | 2/1983 | Argarwal | 524/484 |
| 4,480,063 | 10/1984 | Lundberg | 524/516 |
| 4,483,957 | 11/1984 | Lundberg | 524/516 |
| 4,489,180 | 12/1984 | Lundberg | 524/516 |
| 4,497,923 | 2/1985 | Lundberg | 524/516 |
| 4,517,333 | 5/1985 | Lundberg | 524/516 |
| 4,520,158 | 5/1985 | Peiffer | 524/516 |
| 4,522,960 | 6/1985 | Peiffer | 524/516 |
| 4,537,919 | 8/1985 | Agarwal | 524/516 |
| 4,552,916 | 11/1985 | Lundberg | 524/516 |
| 4,579,671 | 4/1986 | Lundberg | 524/516 |
| 4,584,339 | 4/1986 | Lundberg | 524/516 |

FOREIGN PATENT DOCUMENTS

1087819 10/1967 United Kingdom ............... 524/484

*Primary Examiner*—C. Warren Ivy
*Attorney, Agent, or Firm*—Richard E. Nanfeldt

[57] ABSTRACT

The present invention relates to a process for the viscosification of an aqueous liquid which includes the steps of forming two solvent systems of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated polymer (water insoluble) in one of the solvent systems to form a first solution, and dissolving a cationic polymer such as a copolymer of vinyl pyridine, a concentration of the neutralized sulfonated polymer in the first solution being about 0.2 to about 10 weight percent, a concentration of the copolymer or vinyl pyridine in the second solution being about 0.2 to about 10 weight percent, a viscosity of both solutions being less than about 200 cps; mixing both solutions together to form a solution of an interpolymer complex of sulfonated polymer and vinyl pyridine polymer, and admixing or contacting said solution of said interpolymer complex with about 5 to about 500 volume percent water, the water being immiscible with the organic liquid and the polar cosolvent transferring from the organic liquid to the water phase, thereby causing the polymer containing phase to gel (i.e. thicken).

16 Claims, No Drawings

CONTROLLED GELATION OF HYDROCARBON SOLUTIONS CONTAINING INTERPOLYMER COMPLEXES

This is a continuation of application Ser. No. 547,955, filed Nov. 2, 1983, now abandoned.

BACKGROUND OF THE INVENTION

1. Field of the Invention

The present invention relates to a process for the viscosification of an organic liquid which includes the steps of forming two solvent systems of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated polymer (water insoluble) in one of the solvent systems to form a first solution, and dissolving a cationic polymer such as a copolymer of vinyl pyridine, a concentration of the neutralized sulfonated polymer in the first solution being about 0.2 to about 10 weight percent, a concentration of the copolymer of vinyl pyridine in the second solution being about 0.2 to about 10 weight percent, the viscosity of both solutions being less than about 2,000 cps; mixing both solutions together to form a solution of an interpolymer complex of sulfonated polymer and vinyl pyridine copolymer, and admixing or contacting said solution of said interpolymer complex with about 5 to about 500 volume percent water, the water being immiscible with the organic liquid and the polar cosolvent transferring from the organic liquid to the water phase, thereby causing the polymer containing phase to gel (i.e. thicken).

2. Description of the Prior Art

There are many applications for very viscous or gelled solutions which are quite diverse. There are also a number of physical and chemical techniques for preparing such systems. The present invention is concerned with a process for gelling a fluid system by contacting the fluid system with a relatively low viscosity, organic liquid solution of interacting polymers. The potential applications for this process and the products derived therefrom will be evident in the instant application. Some of these applications are as a viscosifier for hydrocarbon solutions, such as a shut-off process in grouting operations, a water shut-off technique in oil well applications and a spacer or soluble plug in oil well applications.

The instant invention differs from a number of applications, Ser. Nos. 223,482; 136,837; and 106,027, filed by Robert Lundberg et al, one of the instant inventors. Respectively, U.S. Pat. Nos. 4,361,658; 4,322,329 and 4,282,130. These previously filed applications were directed to the gelling of the organic liquid by a water insoluble, neutralized sulfonated polymer whereas the instant invention is directed to the gelling of an organic fluid by an interpolymer complex.

The instant invention describes a process which permits (1) the preparation of polymer solutions of interpolymer complexes in organic liquid having reasonably low viscosities (i.e., less than about 200 cps); and (2) the preparation of extremely viscous solutions or gels of the organic fluid from such solutions by a process of mixing or contacting water with the polymer solution. These operations are achieved by the use of the appropriate concentration; 0.2 to 10.0 weight percent of water insoluble, interpolymer complexes, having low concentrations of ionic groups present.

In the instant process, the role of the polar cosolvent is that of solvating the ionic groups while the main body of the solvent interacts with the polymer backbone. For example, xylene is an excellent solvent for the polystyrene backbone and when combined with 5 percent methanol will dissolve, readily and rapidly, the previous example of lightly sulfonated polystyrene.

The remarkable and surprising discovery of the instant invention is that when small (or large) amounts of water are combined and mixed with solutions of ionic polymers dissolved at low concentrations (about 0.2 to 10 weight percent) in such mixed solvent systems as those described above, a phase transfer of the cosolvent occurs from the nonpolar organic liquid phase to the water phase, thus by causing the polymer containing phase to gel (i.e. thicken). Indeed, it is possible to achieve increases in viscosity of the polymer solution by factors of $10^3$ (1,000) or more by the addition of only 5 to 15 percent water based on the polymer solution volume. This unusual behavior is postulated to arise from the removal of the polar cosolvent from the organic liquid phase into the separate aqueous phase.

SUMMARY OF THE INVENTION

The present invention relates to a process for the viscosification of an organic liquid which includes the steps of forming two solvent systems of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated polymer (water insoluble) in one of the solvent systems to form a first solution, and dissolving a cationic polymer such as a copolymer of vinyl pyridine, a concentration of the neutralized sulfonated polymer in the first solution being about 0.2 to about 10 weight percent, a concentration of the copolymer of vinyl pyridine in the second solution being about 0.2 to about 10 weight percent, the viscosity of both solutions being less than about 2.000 cps; mixing both solutions together to form a solution of an interpolymer complex of sulfonated polymer and vinyl pyridine copolymer, and admixing or contacting said solution of said interpolymer complex with about 5 to about 500 volume percent water, the water being immiscible with the organic liquid and the polar cosolvent transferring from the organic liquid to the water phase, thereby causing the polymer containing phase to gel (i.e. thicken).

Accordingly, it is a primary object of the instant invention to describe an economical process for forming a highly viscous or gelled polymer solution having a viscosity greater than about 50,000 cps preferably greater than about 50,000 cps.

A further object of the instant invention is to provide a process for forming a gel solution which can be used as a viscosifier.

A still further object of the instant invention is to employ the instant process as an integral part of well control procedures such as enhanced oil recovery, water shut-off means, viscous foams and spacers and soluble plugs.

GENERAL DESCRIPTION

The present invention relates to a process for the viscosification of a polymeric solution which includes the steps of forming two solvent systems of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated polymer (water insoluble) in one of the solvent systems to form a first solution, and dissolving a cationic polymer such as a copolymer of vinyl pyridine, a concentration of the neutralized sulfonated polymer in the first solution being about 0.2 to about 10 weight percent, a concentration of the vinyl pyridine in the second solution being about 0.2 to about 10 weight percent, the viscosity of both solutions being less than about 200 cps; mixing both solutions together to form a solution of an interpolymer complex of sulfonated polymer and vinyl pyridine copolymer, and admixing or contacting said solution of said interpolymer complex with about 5 to about 500 volume percent water, the water being immiscible with the organic liquid and the polar cosolvent transferring from the organic liquid to the water phase, thereby causing the polymer containing phase to gel (i.e. thicken).

The gelled polymer solution having a viscosity greater than 50,000 cps is formed by the addition of water to the polymer solution which comprises a water insoluble, interpolymer complex of a cationic polymer and an anionic nonpolar, organic liquid and a polar cosolvent, wherein the solution has a viscosity less than 2,000 cps. The concentration of interpolymer complex in the solution is 0.2 to 10 weight percent. Upon the addition of water to the solution of the interpolymer complex the polar cosolvent rapidly transfers from the solution to the aqueous phase causing immediate gelation. The water can be removed by conventional liquid extraction methods.

The component materials of the instant process generally include a water insoluble, interpolymer complex at a concentration level of 0.2 to 10 weight percent, a nonpolar organic liquid, polar cosolvent and water.

In general, the water insoluble interpolymer complex comprises a mixture of an anionic polymer and a cationic polymer. The anionic polymer contains from about 10 to about 200 meq. pendant ionomeric groups per 100 grams of polymer, more preferably from 10 to 100 meq. pendant ionomeric groups. The ionic groups may be conveniently selected from the groups consisting of carboxylate, phosphonate, and sulfonate, preferably sulfonate groups. In most instances, the anionic polymers utilized in the instant invention are neutralized with the basic materials selected from Groups IA, IIA, IB and IIB of the Periodic Table of Elements and lead, tin and antimony, as well as ammonium and amine counterions. Anionic polymers which are subject to the process of the instant invention are illimitable and include both plastic and elastic polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene-/ethylene oxide, acrylic acid copolymers with styrene, sulfonated polyisobutylene, sulfonated ethylenepropylene terpolymers, sulfonated polyisoprene, and sulfonated elastomers and their copolymers. The preferred polymers of the instant invention are ethylenepropylene terpolymers and polystyrene, wherein ethylenepropylene terpolymer is most preferred.

Neutralization of the cited anionic polymers with appropriate metal hydroxides, metal acetates, metal oxides, or ammonium hydroxide etc., can be conducted by means well-known in the art. For example, the sulfonation process as with Butyl rubber containing a small 0.3 to 1.0 mole percent unsaturation can be conducted in a suitable solvent such as toluene, with acetyl sulfate as the sulfonated agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to insure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said anionic groups may vary from 0 (free acid form) to greater than 100 mole percent, preferably 50 to 100 percent. With the utilization of neutralized anionic in this instant invention, it is preferred that the degree of neutralization be substantially complete, that is with no substantial free acid present and without substantial excess of the base other than that needed to insure neutralization. The neutralized anionic polymers possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The anionic polymers of the instant invention may vary in number average molecular weight from 1,000 to 10,000,000 preferably from 5,000 to 500,000, most preferably from 10,000 to 200,000. These polymers may be prepared by methods known in the art, for example, see U.S. Pat. No. 3,642,728, hereby incorporated by reference.

The water insoluble, ionomeric polymers may be incorporated into the organic liquid to form a first solution at a level of from 0.2 to 10 weight percent and more preferably from about 0.5 to 10 weight percent, based on the organic liquid and the polar cosolvent.

Specific examples of preferred anionic polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated polypropylene copolymers, sulfonated styrenemethyl methacrylate copolymers, (styrene)-acrylic acid copolymers, sulfonated polyisobutylene, sulfonated ethylenepropylene terpolymers, sulfonated polyisoprene, sulfonated polyvinyl toluene and sulfonated polyvinyl toluene copolymers.

The anionic polymers of the instant invention may be prepared prior to incorporation into the organic solvent, or by neutralization of the acid from a situ. For example, preferably the acid derivative is neutralized immediately after preparation. For example, if the sulfonation of polystyrene is conducted in solution, then the neutralization of that acid derivative can be conducted immediately following the sulfonation procedure. The neutralized anionic polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these anionic polymers in situ; however, this is not a preferred operation, since in situ neutralization requires preparation of the sulfonic acid in the organic liquid which is to be subjected to the instant process, or the acid form of the anionic polymer must be dissolved in said organic liquid. The latter approach may involve handling of an acid form of an anionic polymer which has limited thermal stability. Therefore, it is quite apparent that the preparation and isolation of a neutralized anionic polymer affords the maximum latitude in formulation, less problems in handling polymers of limited thermal stability and maximum control over the final mixture of anionic polymer, polar cosolvent and organic liquid.

The organic liquids, which may be utilized in the instant invention, are selected with relation to the anionic and cationic polymer and vice-versa. The organic liquid is selected from the group consisting essentially of aromatic hydrocarbons, cyclic aliphatic ethers, aliphatic ethers, or organic aliphatic esters and mixtures thereof.

The cationic polymers employed in the instant invention are polymers containing about 0.1 to about 25 weight percent quaternary amine groups, more preferably about 0.5 to about 20, and most preferably about 1 to about 15. An especially preferred cationic polymer is vinyl pyridine. The molecular weight of the quaternary amine polymers, as measured by gel chromatography permeation, is about 10,000 to about 10,000,000 more preferably about 200,000 to about 5,000,000 and most preferably about 50,000 to about 3,000,000. The cationic polymer is dissolved in a solvent system identical to the solvent system used to form the first solution of the anionic polymer. The second solution of the cationic polymer solvent and polar cosolvent contains about 0.1 to about 25 weight percent of cationic polymer, more preferably about 0.5 to about 15, and most preferably about 0.5 to about 10.

The first solution of the anionic polymer and the second solution of the cationic polymer are mixed together to form the interpolymer complex which is the association of the anionic and cationic polymers through the formation of a complex which leads to a network formation. The molar ratio of the anionic/cationic polymers is about 0.1 to about 20, more preferably about 0.2 to about 15, and most preferably about 0.4 to about 10.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylenedichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as Solvent "100 Neutral", "150 Neutral" and similar oils, benzene, diesel oil, toluene, xylene, ethyl benzene, pentane, hexane, heptane, octane, isooctane, nonane, decane aromatic solvents, ketone solvents. |
| sulfonated styrene-methyl-methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl, ether, methyl oleate, aliphatic oils, oils predominantly paraffinic in nature and mixtures containing naphthenic hydrocarbons. "Solvent 100 Neutral", "Solvent 150 Neutral" and all related oils, low molecular weight polymeric oils such as squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |
| vinyl pyridine with styrene or t-butyl styrene | benzene, toluene, xylene, ethyl benzene, styrene, t-butyl styrene, aliphatic oils, aromatic oils, hexane, heptane, decane, nonane. |

The method of the instant invention includes incorporating a polar cosolvent, for example, a polar cosolvent in the mixture of organic liquid and water insoluble anionic polymer to solubilize the pendant ionomeric groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble anionic polymer, and polar cosolvent. The solvent system of polar cosolvent and organic liquid in which the water insoluble neutralized sulfonated (anionic) polymer is dissolved contains less than about 10 weight percent of the polar cosolvent, more preferably about 0.1 to about 5.0 weight percent, and most preferably about 0.1 to about 5.0 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or tri-functional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The amount of water added to the solution of water insoluble, neutralized sulfonated polymer, organic liquid and polar cosolvent having a viscosity of less than about 2,000 cps, is about 5 to about 500 volume percent of water, more preferably about 10 to about 300 volume percent water, most preferably about 10 to about 200 volume percent water.

DETAILED DESCRIPTION OF THE PREFERRED EMBODIMENT

The following examples will demonstrate the performance of sulfonated ethylene-propylene-diene polymer of varying sulfonate levels in several specific aqueous environments.

EXAMPLE 1

Polymers A and B having anionic and cationic functionalities were dissolved in xylene at a concentration of 1.1 weight percent and 2 weight percent, respectively. Various mixtures of these two solutions were prepared.

Polymer A (MS-14) is a zinc-Sulfo-EPDM at 10 meq. sulfonation level on a 90,000 weight average molecular weight EPDM backbone. The backbone is composed of 55% ethylene, 40% propylene and 5% ethylidenenorbornene by weight.

Polymer B (7742-154-2) is a copolymer of styrene and vinyl pyridine at an 8 mole percent composition of vinyl pyridine. The molecular weight of this polymer is about 2 million.

Mixtures of the xylene solutions of these two polymers were blended with additional xylene, as necessary, to yield interpolymer complex solutions in xylene with total polymer concentrations and cationic (N+) to anionic (SO$_3^-$) ratios shown in Table I. The table also shows the resulting solution viscosities at 25° C. and at shear rate of 60 sec$^{-1}$.

TABLE I

VISCOSITY OF INTERPOLYMER COMPLEX SOLUTIONS IN XYLENE AT 25° C. AND SHEAR RATE OF 60 SEC$^{-1}$

| Composition | Interpolymer Composition* | | Viscosity, cP Total Polymer Concentration | |
|---|---|---|---|---|
| | Amine/SO$_3^-$ (Mole/Mole) | Amine Polymer/SO$_3^-$ Polymer (ppm/ppm) | 3000 ppm | 5000 ppm |
| *A | 0 | 0 | 0.9 | 1.2 |
| B | 0.29 | 0.037 | 2.7 | 3.3 |
| C | 0.60 | 0.076 | 2.1 | 23.0 |
| D | 0.92 | 0.116 | 2.3 | 56.2 |
| E | 1.25 | 0.158 | 2.8 | 128.0 |
| F | 1.60 | 0.202 | 4.2 | ** |
| G | 2.55 | 0.321 | 9.0 | ** |
| H | 3.61 | 0.455 | 12.6 | ** |
| *I | ∞ | ∞ | 1.6 | 2.7 |

*o and ∞ refer to one of the two polymers alone.
**Estimated to be between 500 to 1000 at 60 sec$^{-1}$, much higher at lower shear rates.
Viscostiy of xylene at 25° C. is 0.6 cP.

This example shows that an interpolymer complex solution at relatively low concentration, made up of Polymers A and B described above, can have a significantly higher viscosity than the solutions of the individual polymers.

EXAMPLE 2

Two percent by weight of methyl alcohol was added to Composition E of Table I, Example 1, at 5000 ppm polymer. The viscosity dropped from 128 cP to 1.2 cP.

This example shows that the complex can be destroyed effectively and selectively by adding an ingredient, such as methanol. The high viscosity obtained by the creation of an interpolymer complex was dropped to the level which can be expected from mixing the two individual polymers if they would have not complexed.

EXAMPLE 3

The following polymer solutions were prepared for subsequent gelation described in Example 4:

| Solution | I | II | III | IV | V |
|---|---|---|---|---|---|
| Polymer | Zn—S—EPDM MS-16A | Zn—S—EPDM MS-16A | Sty—VPyr 154-2 | Zn—S—EPDM MS-16A | Interpolymer Complex* |
| Weight % Polymer | 3 | 3.43 | 2 | 5 | 5* |
| Solvent: Xylene/Methanol by volume | 95/5 | 92.83/7.18 | 100/0 | 95/5 | 95/5 |
| Viscosity, Cp at 25° C. | 13.5 | 19.3 | 42.7 | 57.2 | — |

*Composed of 4 weight percent MS-16A and 1 weight percent 154-2.

Where xylene and methanol were used as the solvent systen, they were premixed based on the volumetric ratio shown above. In all cases, except for solution III, a high shear Arde Barinco lab mixer was used to prepare the polymer solutions. Ingredients were added to the solvent and mixing continued until complete dissolution was obtained; this took about 1 hour. However, for solution V, for which the two polymers were dry blended at a weight ratio of 4:1 (MS-16A:StyVPyr) before addition, the dissolution process took two hours. Solution III was prepared by using a magnetic stirrer.

The polymers used in the above solutions were Zn-Sulfo-EPDM, MS-16A, and a copolymer of styrene and vinyl pyridine, 154-2. The Zn-S-EPDM (i.e., the MS-16A polymer) was based on an EPDM backbone as in polymer A of Example 1, but had a sulfonation level of 20 meq. per 100 g of backbone polymer. The Sty-VPyr copolymer was polymer B of Example 1.

Solutions II and III were composed in the given proportions such that 2.33 parts by weight of solution II blended with 1 part of solution III will yield a total polymer concentration of 3 weight percent and a xylene/methanol volumetric ratio of 95/5. Such a blend would then be comparable to solution I which had a 3 weight percent polymer content and a similar solvent system. The polymer ratio of a 2.33/1 blend of solutions II and III would be 4:1 by weight of Zn-S-EPDM/Sty-VPyr, as it was in solution V. Such a polymer ratio is equivalent to a molar ratio of about 1:1 between sulfonate and pyridine groups.

As can be seen from the above table, the solutions are of relatively low viscosities. Solution V exhibited two liquid phases, and its viscosity was not measured.

EXAMPLE 4

Various solution combinations from Example 3 were gelled by contacting the solutions with water under high shear at ambient conditions. An Eberbach semimicro blender was employed as the shearing device with a drive providing 21,000 rpm to the blender blade.

The solution, or a combination of solutions as described below, were added to the mixer first. When a combination of solutions were used, the mixer was turned on for 10 seconds and stopped for 1 minute before proceeding to the next step. A given amount of water was added next, and the mixer was turned on for 30 seconds. The resulting solution or gel was then removed and placed in a glass jar for further measurements.

Gelation product viscosity was measured by using a Brookfield viscometer with Spindle Nos. 2, 3, TF or TE, as needed at ambient conditions. Where strong gels were obtained as a result of the gelling process, a penetration measurement following the method described in ASTM D-1403 (volume 17) for lubricating greases was performed. The total weight of cone and shaft used was 37.3 g (half-scale cone). Penetration in units of 0.1 mm was taken 5 seconds after the cone was released.

Measurements were conducted 24 hours, 1 week and 3 weeks after solutions were contacted with water. In cases where more than one phase was observed and the product viscosity was low, the sample was shaken to the point it appeared homogeneous. In multiphase gels, the upper phase was measured, as the lower phase was excess of water.

This example basically compares gelation products based on Zn-S-EPDM alone and products based on Zn-S-EPDM and a copolymer of styrene and vinyl pyridine. Solutions of 3 and 5 weight percent total polymer concentration in a xylene/methanol solvent were used, as described in Example 3. Interpolymer complexes were mixed at a molar ratio of about 1:1 between sulfonate and pyridine groups by using either solution V (at 5 percent) or mixtures of solutions II and III of Example 3 to obtain a 3% interpolymer complex as described in Example 3.

Water was added in a range of between 1 and 30 parts of water to 100 parts of polymer solution.

Measurements performed after contacting the solutions with water are summarized in Tables II and III.

There was a general tendency for more viscous gelation products with aging time, as shown in a few cases in Tables II and III.

This example shows the differences that exist between gelling a single sulfonated EPDM material and between gelling an interpolymer complex at the same total polymer level and using the same Sulfo-EPDM as one of the components. At lower water levels, the gelation products based on the interpolymer complex displayed a significantly higher viscosity.

TABLE II

VISCOSITY OR PENETRATION OF GELATION PRODUCTS RESULTING FROM CONTACTING 3 WEIGHT % POLYMER SOLUTIONS WITH WATER
(Measured 24 hours after gelation)

| Amount of Water Used phs* | Brookfield Viscosity CP | | Penetration 0.1 mm Units | |
|---|---|---|---|---|
| | S—EPDM | Interpolymer Complex | S—EPDM | Interpolymer Complex |
| 1 | 49 | 139 | | |
| 2 | 100 | 610 | | |
| 5 | 1350 | 15,300 | | |
| 10 | 53,100 | 330,000 | | |
| 15 | 300,000 | too high | — | 222** |
| 20 | 1,370,000 | — | — | 226 |
| 30 | — | — | 214 180*** | 232 196*** |

*Parts of water per 100 parts of polymer solution.
**Measured after one week.
***Measured after three weeks.

TABLE III

VISCOSITY OR PENETRATION OF GELATION PRODUCTS RESULTING FROM CONTACTING 5 WEIGHT % POLYMER SOLUTIONS WITH WATER
(Measured 24 hours after gelation)

| Amount of Water Used phs* | Brookfield Viscosity CP | | Penetration 0.1 mm Units | |
|---|---|---|---|---|
| | S—EPDM | Interpolymer Complex | S—EPDM | Interpolymer Complex |
| 1 | 235 | 2,600 | | |
| 5 | 300,000 | — | — | 222 176** |
| 30 | — | — | 151 131/174** | 174 157/182** |

*Parts of water per 100 parts of polymer solution.
**Measured after three weeks. The second number indicates penetration after 120 sec.; standard penetration is taken after 5 sec.

There are several important distinctions of this invention over the prior art. At low levels of water, (and presumably also at low polymer levels) the complexes offer a higher viscosity than obtained with the ionomer alone. Yet at high water concentrations, (or at higher polymer levels) the complex offers a somewhat lower gel strength. This general characteristic is due to an inherently flatter viscosity/water concentration profile than is obtained with only ionomers. At high polymer (or high water) concentrations, it is proposed that there is a plasticization interaction between the two interacting polymers. This can be very desirable in controlling the degree of gelation as a function of water or its rate. This new technology is therefore less sensitive to polymer concentration than that described in the prior art.

What is claimed is:

1. A process for forming a thickened fluid having a viscosity of at least about 30 cps at 25° C. at a shear rate of 60 sec$^{-1}$ which includes the steps of:
   (a) forming two identical solvent systems of an organic liquid selected from the group consisting of aromatic hydrocarbons, cyclic aliphatic ethers, aliphatic ethers and aliphatic esters and mixtures thereof and a polar cosolvent selected from the group consisting of alcohols, amines, amides and phosphates having a solubility parameter of at least 10.0, each of two said solvent systems containing the same said organic liquid and the same said polar cosolvent, said polar cosolvent being less than about 15 weight percent of each said solvent system of said organic liquid and said polar cosolvent, a viscosity of each said solvent system being less than about 100 cps at 25° C. at a shear rate of 60 sec$^{-1}$;

(b) dissolving, an anionic polymer which is water insoluble in said first solvent system to form a first solution wherein the concentration of said anionic polymer is about 0.5 to about 10.0 weight percent, said organic polymer having about 10 to about 200 meq. of neutralized anionic groups per 100 grams of anionic polymer, said anionic groups being 50 to 100 mole percent neutralized, a viscosity of said first solution being less than about 2,000 cps at 25° C. at a shear rate of 60 sec$^{-1}$;

(c) dissolving a cationic polymer containing about 0.1 to about 25 weight percent vinylpyridine groups in said second solvent system to form a second solution, a concentration of said cationic polymer in said second solution being about 0.5 to about 10 weight percent, a viscosity of said second solution being less than about 2,000 cps at 25° C. at a shear rate of 60 sec$^{-1}$;

(d) mixing said first solution and said second solution to form a solution of an interpolymer complex of said cationic polymer and said anionic polymer, a molar ratio of said anionic/cationic polymer being about 0.1 to about 20.0, the concentration of said interpolymer complex being about 3.0 to 10.0 weight percent; and (e) adding with mixing about 5 to about 500 volume percent water based on said solution of said interpolymer complex to said solution of interpolymer complex, said water being immiscible with said solution of interpolymer complex, said polar cosolvent transferring from said organic liquid to said water thereby causing the viscosity of said organic liquid to increase to at least 5,600 cps at 25° C. at a shear rate of 60 sec$^{-1}$.

2. A process according to claim 1 further including a means for removing said aqueous fluid from said thickened fluid.

3. A process according to claim 1, wherein said anionic polymer is a neutralized sulfonated polymer which has about 10 to about 200 meq. of pendant neutralized sulfonated groups per 100 grams of polymer.

4. A process according to claim 3 wherein said SO$_3$H are neutralized within an ammonium or metal counterion.

5. A process according to claim 4 wherein said metal counterion is selected from the group consisting of antimony, tin, lead or Groups IA, IIA, IB and IIB of the Periodic Table of Elements.

6. A process according to claim 4 wherein said SO$_3$H groups are at least 90 mole percent neutralized.

7. A process according to claim 3 wherein said neutralized sulfonated polymer is formed from an elastomeric polymer.

8. A process according to claim 7 wherein said elastomeric polymer is selected from the group consisting of EPDM terpolymer and Butyl rubber.

9. A process according to claim 3 wherein said neutralized sulfonated polymer is formed from a thermoplastic.

10. A process according to claim 1 wherein said polar cosolvent has a greater polarity than said organic liquid.

11. A process according to claim 1 wherein said organic liquid is selected from the group consisting of aliphatic hydrocarbons and aromatic hydrocarbons.

12. A process according to claim 1 wherein said organic liquid is selected from the group consisting of benzene, toluene, ethyl benzene, xylene and styrene and mixtures thereof.

13. A process according to claim 1 wherein said polar cosolvent is selected from the group consisting of methanol, ethanol, propanol, and isopropanol and mixtures thereof.

14. A process according to claim 1 wherein said polar cosolvent has a solubility parameter of at least about 10 and is water miscible.

15. The process according to claim 1 wherein a molar ratio of said anionic polymer to said cationic polymer is about 10 to about 0.1.

16. A process for forming a thickened fluid having a viscosity of at least about 30 cps at 25° C. at a shear rate of 60 sec$^{-1}$ which includes the steps of:

(a) forming two solvent systems of xylene and methanol, said methanol being less than about 15 weight percent of each said solvent system of said xylene and said methanol, a viscosity of each said solvent system being less than about 100 cps at 25° C. at a shear rate of 60 sec$^{-1}$;

(b) dissolving a zinc neutralized sulfonated EPDM terpolymer which is water insoluble in said first solvent system to form a first solution wherein the concentration of said sulfonated EPDM terpolymer is about 0.5 to about 10.0 weight percent, said sulfonated EPDM terpolymer having about 10 to about 200 meq. of neutralized sulfonate groups per 100 grams of said sulfonated EPDM terpolymer, said sulfonate groups being 50 to 100 mole percent neutralized, a viscosity of said first solution being less than about 2,000 cps at 25° C. at a shear rate of 60 sec$^{-1}$;

(c) dissolving a styrene vinylpyridine copolymer containing about 0.1 to about 25 weight percent vinylpyridine groups in said second solvent system to form a second solution, wherein said first solvent system is identical to said second solvent system, a concentration of said styrene vinylpyridine copolymer in said second solution being about 0.5 to about 10 weight percent, a viscosity of said second solution being less than about 2,000 cps at 25° C. at a shear rate of 60 sec$^{-1}$;

(d) mixing said first solution and said second solution to form a solution of an interpolymer complex of said sulfonated polymer and said styrene vinylpyridine copolymer, a molar ratio of said sulfonated EPDM terpolymer/styrene vinylpyridine copolymer being about 0.1 to about 20.0, the concentration of said interpolymer complex being about 3.0 to 10.0 weight percent; and (e) adding with mixing about 5 to about 500 volume percent water based on said solution of said interpolymer complex to said solution of interpolymer complex, said water being immiscible with said solution of interpolymer complex, said polar cosolvent transferring from said organic liquid to said water thereby causing the viscosity of said organic liquid to increase to at least 5,600 cps at 25° C. at a shear rate of 60 sec$^{-1}$.

* * * * *